US010271475B2

United States Patent
Dettmer et al.

(10) Patent No.: US 10,271,475 B2
(45) Date of Patent: Apr. 30, 2019

(54) MACHINE FOR HARVESTING ROOT CROP

(71) Applicant: Grimme Landmaschinenfabrik GmbH & Co. KG, Damme (DE)

(72) Inventors: Franz-Josef Dettmer, Ankum (DE); Stefan Feldkämper, Ascheberg (DE)

(73) Assignee: Grimme Landmaschinenfabrik GmbH & Cp. KG, Damme (DE)

( * ) Notice: Subject to any disclaimer, the term of this patent is extended or adjusted under 35 U.S.C. 154(b) by 88 days.

(21) Appl. No.: 14/922,170

(22) Filed: Oct. 25, 2015

(65) Prior Publication Data
US 2016/0113193 A1 Apr. 28, 2016

(30) Foreign Application Priority Data

Oct. 28, 2014 (DE) .......................... 10 2014 015 834

(51) Int. Cl.
*A01D 17/00* (2006.01)
*A01D 33/00* (2006.01)
(Continued)

(52) U.S. Cl.
CPC ............ *A01D 17/00* (2013.01); *A01D 17/10* (2013.01); *A01D 33/00* (2013.01); *A01D 67/00* (2013.01)

(58) Field of Classification Search
CPC ........ A01D 17/00; A01D 17/10; A01D 33/00; A01D 67/00
See application file for complete search history.

(56) References Cited

U.S. PATENT DOCUMENTS 945,192 A * 1/1910 Rice .................. A01D 25/02
171/110
1,461,935 A * 7/1923 Raasch .............. A01D 17/10
171/47
(Continued)

FOREIGN PATENT DOCUMENTS

CN 102 084 750 6/2011
DE 1 224 079 9/1966
(Continued)

OTHER PUBLICATIONS

Grimme Landmaschnenfabrik: SF 150/170-60 2-row, self-propelled potato harvester with large bunker (company brochure; English version of brochure cited in the specification on p. 2, 1st full paragraph); Damme, Germany (2008).

*Primary Examiner* — Jamie L McGowan
(74) *Attorney, Agent, or Firm* — Gudrun E. Huckett

(57) ABSTRACT

A machine for harvesting root crop has a lifting device that in a position of use on a harvest field lifts several rows of the crop with admixtures from the soil transversely to the travel direction in accordance with a lifting width. From the lifting device the loosened mixture of crop and admixtures is movable opposite to the travel direction by a first longitudinal conveyor and is transferred onto a second screening belt conveyor. Between longitudinal conveyor and screening belt conveyor, a transfer zone is defined with belt overlap. The first longitudinal conveyor in the conveying direction together with the upstream lifting device forms a module that is movable in transverse direction of the machine relative to the second screening belt conveyor. This module, relative to the common transfer zone, can be moved at least sectionwise into a position of lateral spacing relative to the second screening belt conveyor.

31 Claims, 14 Drawing Sheets

(51) Int. Cl.
*A01D 67/00* (2006.01)
*A01D 17/10* (2006.01)

(56) References Cited

U.S. PATENT DOCUMENTS

| | | | | |
|---|---|---|---|---|
| 1,828,261 A | * | 10/1931 | Stoltenberg | A01D 17/10 171/127 |
| 1,848,781 A | * | 3/1932 | Hansen | A01D 17/10 171/110 |
| 1,960,857 A | * | 5/1934 | Stoltenberg | A01D 17/00 171/119 |
| 2,010,335 A | * | 8/1935 | Stoltenberg | A01D 17/10 171/114 |
| 2,775,438 A | * | 12/1956 | Bach | E01B 27/10 171/1 |
| 3,198,259 A | | 8/1965 | Manuel | |
| 3,316,666 A | * | 5/1967 | Spend | E01B 27/107 171/16 |
| 3,757,867 A | | 9/1973 | Hook et al. | |
| 4,121,667 A | * | 10/1978 | Curl | A01D 17/10 171/110 |
| 4,560,008 A | * | 12/1985 | Carruthers | A01D 15/04 171/130 |
| 4,753,296 A | | 6/1988 | Kruithoff | |
| 4,798,248 A | | 1/1989 | Schwitters | |
| 4,842,076 A | | 6/1989 | Welp | |
| 5,189,243 A | * | 2/1993 | Hambric | F41H 11/24 171/105 |
| 5,197,211 A | * | 3/1993 | Haug | E01H 1/042 15/84 |
| 6,443,234 B1 | | 9/2002 | Raymond | |
| 7,028,459 B2 | * | 4/2006 | Lohrentz | A01D 57/20 56/192 |
| 7,789,166 B2 | | 9/2010 | Wallace | |

FOREIGN PATENT DOCUMENTS

| | | |
|---|---|---|
| DE | 32 35 087 A1 | 4/1983 |
| DE | 36 31 969 A1 | 3/1988 |
| DE | 88 09 672 | 9/1988 |
| DE | 93 20 575 U1 | 10/1994 |
| DE | 296 13 018 U1 | 11/1996 |
| DE | 296 19 474 U1 | 4/1997 |
| DE | 10 2007 034 446 A1 | 1/2009 |
| EP | 0 359 904 A1 | 3/1990 |
| EP | 1 405 554 A1 | 4/2004 |
| FR | 2 440 144 A1 | 5/1980 |
| GB | 574 777 | 1/1946 |
| JP | H08 256 552 A | 10/1996 |
| RU | 2479981 | 2/2013 |

* cited by examiner

Fig. 5

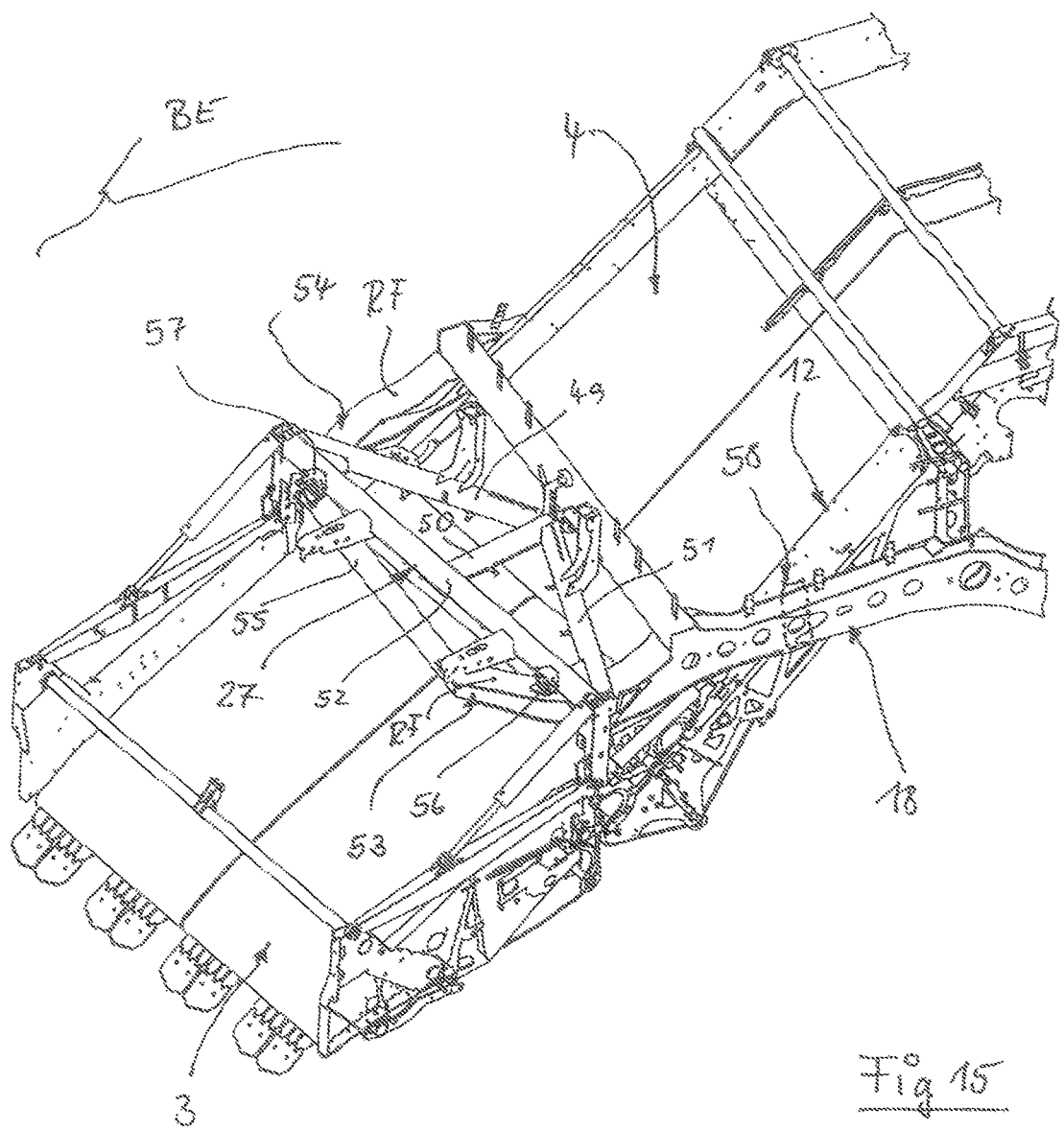

MACHINE FOR HARVESTING ROOT CROP

BACKGROUND OF THE INVENTION

The invention concerns a machine for harvesting root crop, in particular in the form of a complete potato harvesting machine; comprising a lifting device that in a position of use on a harvest field lifts several rows of the crop with admixtures from the soil transversely to the travel direction in accordance with a lifting width, wherein from the lifting device the loosened mixture of crop and admixtures by means of a first longitudinal conveyor is movable opposite to the travel direction and is transferred onto a second screening belt conveyor, wherein between longitudinal conveyor and screening belt conveyor a transfer zone is defined that comprises a belt overlap:

Machines for harvesting and processing root crop, in particular potatoes, have been known for a long time in various embodiments of pull-behind devices or self-propelled machines. In such machine configurations, lifting devices that lift several rows of crop with admixtures from the soil are used in connection with a downstream conveying and cleaning system. DE 32 35 087C2 discloses such a construction with a root crop harvesting machine that is pulled by a tractor.

In a potato harvesting machine according to DE 93 20 575.9 U1, a screen conveyor with which the crop and the admixtures are supplied to the next cleaning stage is provided downstream of a lifting device that is provided with lifting shares.

A more complex configuration of a pulled potato harvesting machine according to DE 10 2007 034 446 A1 comprises, also downstream of a lifting device, a first longitudinal conveying device which is effective in combination with a second screening belt stage secured in the same frame construction. In this context, downstream of a transfer zone provided with a belt overlap, an upward conveying action of the mixture is provided. In this context, all of the conveying and cleaning component groups are secured on a substantially closed frame construction of the machine so that a linear movement to an upper deflection and sorting section is realized.

A similar construction is provided for a self-propelled complete potato harvesting machine (brochure "SF 150/170-60" of the company Grimme Landmaschinenfabrik GmbH & Co. KG, Damme, Germany, publication number: L05.0851.DE04/08/2000; 2008) wherein a first cleaning unit that receives the crop and is provided with a receiving belt and a first screen belt and a second cleaning unit with a second screen belt are arranged in linear sequence behind each other as conveying component groups. A similar system has already been disclosed in DE 36 31 969 A1 wherein respective transverse conveyor belts are associated herein with the second belt. DE 296 13 018 U1 discloses a potato harvesting machine in which the ridge lifting device and the downstream screening belts are arranged separate from each other on the lifting rocker and the main machine frame.

In the technical further development of such harvesting machines for root crop, for improving the cleaning and sorting conditions, respective components of the conveying complex that are arranged downstream of the leading receiving and cleaning system or respective belt component groups that are provided for manual sorting, for example, in the area of transfer conveyor belts, are replaced by larger component groups that, in relation to the machine frame, may cause a lateral projection. This affects at the same time handling of the system that is to be steered along the field contour because performing a complete lifting process, in particular near the respective edge zones of the field, may be affected by projecting components of the machine and crop loss can thus occur. In the aforementioned concept of the self-propelled complete potato harvesting machines according to the aforementioned brochure "SF 150/170-60", the steering and drive unit is arranged upstream of the pickup system for the crop so that the corresponding length of the machine is considerable.

The object of the invention is to provide a machine for harvesting root crop, in particular in the form of a complete potato harvesting machine, which, with a minimal technical expenditure, can be used as a compact unit so that also in a tight moving space along a boundary area of the harvest field an optimal lifting process is possible and therefore crop losses can be avoided and travel movements at the edges of the field are improved.

SUMMARY OF THE INVENTION

The invention solves this object with a machine of the aforementioned kind wherein the first longitudinal conveyor in the conveying direction together with the upstream lifting device forms a module that is movable in transverse direction of the machine relative to the second screening belt conveyor and the module, relative to the common transfer zone, at least sectionwise can be moved into a position of lateral spacing relative to the second screening belt conveyor.

Important further embodiments result from the dependent claims.

Based on known concepts of harvesting technology for root crop, in particular constructions in the form of complete potato harvesting machines, that move the crop, that has been lifted together with admixtures from the soil in the area of a lifting device by means of conveying systems to a collecting point, the machine structure according to the invention is characterized in that the component groups provided in the area of the crop receiving area are matched to a compact machine that is lifting more than two rows of the crop.

The self-propelled potato harvester according to the invention is connected in the area of its first longitudinal conveyor in the conveying direction of the received crop with the upstream lifting device to a functional module which is designed to be movable relative to the second downstream screening belt conveyor in transverse direction of the machine. Accordingly, in the transfer zone between the longitudinal conveyor and the downstream screening belt conveyor a variably utilizable "dividing plane" of the total conveying system is achieved wherein the novel combined screening and cleaning stretches ensure an optimal conveying stream, even in the lateral spacing position of the "slidable" component groups.

In the longitudinal direction between the longitudinal conveyor and the screening belt conveyor, there is usually a transfer zone (see prior art brochure SF 150/170-60) which comprises a belt overlap so that the crop stream is moved "in a line". In this area, the construction that is improved according to the invention provides the leading functionally modified module that, based on the common transfer zone, can be moved at least sectionwise into a lateral spacing position relative to the second screening belt conveyor. Accordingly, a "spaced-apart" working position of the lifting device in relation to the downstream devices can be achieved.

This concept has the result that, in the area of the respective devices at the machine frame which adjoin the transfer zone and are provided for travel and crop movement, generally known functional-related component group contours can now be designed such that, based on a permissible machine width which is to be dimensioned in particular with regard to the available travel width of the machine when traveling on roads, a compact expandable machine concept is enabled. The machine, in the position of use on the harvest field, is usable at least with a one-sided lateral projection because the leading movable module enables also crop lifting in the boundary area of the field. These projecting modules, after completion of a harvesting cycle and an unhindered use despite "projecting position", can be moved again and returned into the permissible zone of the "travel width".

The use of this machine that utilizes the movement possibilities of the leading module for movement into the lateral spacing position provides in the position of use the advantage that the upstream module, at least in the area of its lifting device can be positioned as an "independent" structure in respective variably adjustable receiving areas on the soil. Moreover, the harvesting performance is not affected because the leading module and the downstream screening belt conveyor, based on the afore described lifting width, define as a whole a cleaning stretch which is substantially provided with an unchanged transport width that remains utilizable in the various travel situations during harvest.

In particular, with the concept according to the invention it is achieved that, due to the spacing of the leading module and the second screening belt conveyor which spacing is acting as a lateral displacement, the machine can be utilized in an improved way in respective positions of use at the boundary of the harvest field. A soil strip which is extending into close proximity to the boundary area can now be more simply engaged and the field can be completely harvested. Also, in a conceivable situation of use in which at the boundary area obstacles are present which project past the boundary area into the field, the machine is utilizable in an improved way because its laterally projecting modules, due to the variable generation of the respective lateral spacing, are guided past obstacles without contacting them and, in this way, damages of the machine can be reliably avoided with minimal actuation expenditure.

In an expedient embodiment which can be realized constructively with minimal expenditure, it is provided that the leading module produces the lateral spacing by a pivot movement relative to the downstream screening belt conveyor or the support parts of the machine. Due to this pivot adjustment that can be controlled comparatively easily, a position of use of the lifting device can be defined which is slanted at an acute angle relative to the longitudinal machine center plane in the area of the leading module. The respective angle position is achievable by a stepped adjustment or continuously.

A corresponding influence of the conveying structure goes hand-in-hand with this pivot movement. Accordingly, in the area of the transfer zone a displacement compensation is provided between the screening belt frame of the leading module and the main frame of the machine. In this "compensation zone" with changed conveying conditions, a belt overlap is produced relative to the "normal position" due to the adjustment of the lateral spacing. As a result of the "simple" pivot movement of the leading component, the belt overlap now has an acute-angle tapering contour in plan view. In this context, these components of the pivot system are matched to each other in such a way that the formation of a drop zone that is open in downward direction is avoided and a lateral escape of crop is avoided.

A second embodiment of the afore described lateral movements for producing the lateral spacing can be achieved in that the leading module can be moved also by a push movement that is realized transversely to the longitudinal machine center plane. In this way, a parallel lateral spacing can be defined at least relative to the second screening belt conveyor. A further embodiment can be directed at moving the leading module into the lateral spacing position by a support which effects a pivot-push movement.

The constructive realization of each of the different variants for the spacing adjustment according to the invention is based on the concept that by means of at least one actuator device which is to be integrated into the machine concept in the area of the transfer zone, the relative movement which effects the lateral spacing is to be introduced between leading module and second screening belt conveyor.

It has been found that generally known connecting component groups are utilizable in the area of the conveying system of a complete potato harvesting machine. For adaptation of the new machine structure to different pivot positions, an actuator device of a simple design is to be integrated into this system. It is configured such that, by means of the actuator device which is effecting the pivot movement positions, the machine can be moved into defined positions that are referred to as crab steering travel positions and, in this position of use, the machine can be used effectively in particular at field boundaries. In this context, it is provided that at the longitudinal sides of the machine that are provided with projecting component groups variable "free" action areas can be defined, preferably by appropriate angle adjustments. For this purpose, the actuator device can position the movable components of the receiving and conveying area in a freely determinable actuating range. In this "pivot position", the support wheels of the machine are steered at the same time such that during the lifting process the soil is rolled across only once so that reduced pressure and compaction are realized.

The adjusting possibility in the area of the transfer zone can also be designed such that, between the rearward end of the leading module in the conveying direction and the receiving area of the second screening belt conveyor, a drop height affecting the conveying stream of the crop is utilizable as an adjustable functional measure. In this way, an acceleration phase is integrated into the cleaning stretch of the mixture of crop and admixtures by means of the variable drop height so that an additional control of the cleaning and sorting process is conceivable. In this context, in the area of the actuator device the use of actuator spindles is provided in an advantageous constructive configuration.

The concept of the at least one actuator device in the area of the transfer zone is also directed at being able to change the drop height and/or the belt overlap in sections thereof or across the entire transverse extension of the transfer zone by means of at least one actuator member. Based on the concept that an operator of the complete potato harvesting machine can monitor or detect the conveyed stream passing through the transfer zone, by appropriate actuating movements acting on the conveying components variable separating and screening conditions are achievable also in the area of the transfer zone.

For the spacing adjustment in the area of the transfer zone, preferably provided as a relative pivot movement, the screening belt conveyor is embodied with adapted frame construction. At a receiving area that is oriented toward the leading transfer zone, the screening belt conveyor is provided with a main frame that is provided with lateral frame struts and that can extend to an upper unloading end.

It is to be assumed that there are various constructive possibilities to achieve the relative pivot movement between the leading receiving module and the screening belt conveyor. Based on this assumption, a preferred configuration of the main frame is provided. The fixation of the main frame in the area of the machine frame which is provided as a basic component group of the system is directed at providing at least sectionwise a torsion-soft support for at least partial sections of the screening belt conveyor. Due to this configuration of components in the form of a torsion-soft support, the advantage is provided that by using substantially unchanged connecting components and appropriate actuating forces in the area of the controllable actuator device, computable "torsional deformations" can be introduced into the "soft" frame system.

It is conceivable to size the frame parts usable for elastic displacement in such a way that with their "pivot quantity" the lateral spacing in the form of the angular pivot travel can be defined. In the subsequent "no-current position" of the actuator member canceling the actuating forces in the area of the actuator device, a substantially "automatic" return movement can be realized in the area of the frame parts so that the components that have been moved relative to each other and exhibit a defined torsional deformation are returned into the "normal position". Subsequently, the entire machine is oriented such that with linear forward travel, without crab steering, the further lifting process is realized.

The construction of the main frame receiving the screening belt conveyor, the main frame being an important component group of the "torsional deformation concept" according to the invention, provides that the main frame is provided, at its end oriented toward the transfer zone, with frame projections that enable the afore described torsion-soft support with minimal expenditure. In particular, it is provided that the main frame which receives the screening belt conveyor is connected to the machine frame by a support bridge that predetermines a torsion-soft leading partial section and a torsion-stiff rearward partial section.

With appropriate selection and dimensioning of the components provided here, the relation of torsion-soft and torsion-stiff component groups can be adjusted to the respective expanded machine construction, in particular with regard to the lifting width with more than three rows.

For producing the lateral spacing in accordance with the invention, particularly by means of the afore described relative pivot movement with "torsional deformation", the frame and chassis construction in the area of the longitudinal machine center plane is provided with a substantially centrally arranged pivot bearing. The construction provides in this context that a support frame engaging at least the first longitudinal conveyor of the upstream module engages by the construction that is arranged in the area of the longitudinal machine center plane the pivot bearing and, in this way, this support frame can be supported so as to be pivotable about a substantially vertical axis.

With this construction it is achieved that the longitudinal conveyor which is received between two lateral legs of the support frame can be positioned by respective lateral pivot movements in the slanted positions of use or positions with the corresponding lateral projection. This system is designed such that all further component groups, in particular the torsion-soft or torsion-stiff partial sections of the operatively connected screening belt conveyor, can remain in their connecting position. Accordingly, for the torsional deformation construction in the area of the transfer zone a concept is realized in which a conceivable detachment and subsequent locking of connecting component groups is completely obsolete.

It has been found that an optimal component support action is achieved when the pivot bearing is connected with the machine frame in the area of a transverse beam. In this way, it is achieved that the actuator device can have support stays that are extending from the pivot bearing, respectively, to the two lateral legs of the leading support frame and, in this way, a support action in the manner of a pivot frame interacting with the actuator member is formed. An expedient configuration of the actuator device provides in this area that the at least one actuator member is provided between the lateral legs of the support frame as well as the main frame of the machine of the downstream screening belt conveyor. In an expedient embodiment, the actuator member is in the form of a hydraulic cylinder.

In relation to the support areas opposite each other relative to the longitudinal machine center plane at the two edge sides of the transfer zone or in relation to the conveyor belt structures that are overlapping each other here, it is provided that said one actuator device is formed by the substantially mirror-symmetrically constructed connecting parts as a whole together with the pivot bearing. In an advantageously embodied variant of this compact actuator device, it is provided that only one hydraulic cylinder as a "one-sided" actuator member is integrated into the system of the two-sided connecting parts and thus the expenditure in regard to hydraulic components is reduced. With this one-sided drive control, the afore described production of the respective spacing position can be affected variably.

In this context, the hydraulic cylinder, on the one hand, is supported on one of the frame struts of the screening belt conveyor. On the other hand, the hydraulic cylinder engages a leading support stay of the longitudinal conveyor and is connected with a guide strut correlated with the pivot frame. It is understood that in these lateral edge areas of the transfer zone provided with the movable parts of the actuator device, further support elements of the two conveyors that form here at the belt overlap are to be secured also. This has the result that, in addition to the actuator member in the form of the hydraulic cylinder, appropriate securing plates and coupling rods or similar support components are to be positioned in this edge area.

Based on the concept of the adjustable complete potato harvesting machine that has a lifting width of more than two rows, it is provided that in the area above the transfer zone a driver's cabin that is supported in the area of the machine frame is provided. In this way, an optimal installation position is predetermined wherein the driver's cabin can be moveable independent of the component groups of the machine frame and the conveying groups secured therein. An optimization of this installation position of the driver's cabin provides that the latter is secured in the area of the support frame supporting the first longitudinal conveyor. Based on the relative pivot movement of component groups in accordance with the invention into the lateral spacing position, it is provided that the driver's cabin advantageously can be moved together with the support frame so that in this way an optimal monitoring position is ensured.

BRIEF DESCRIPTION OF THE DRAWINGS

Further details and advantageous embodiments of the complete potato harvesting machine according to the invention result from the following description and the drawings in which several embodiments are shown. The drawings show in:

FIG. 5 a plan view of the frame parts according to FIG. 4 during straight forward travel;

FIG. 15 an enlarged perspective illustration of the frame construction with support zones in the area of the leading module.

DESCRIPTION OF PREFERRED EMBODIMENTS

Figure 1:
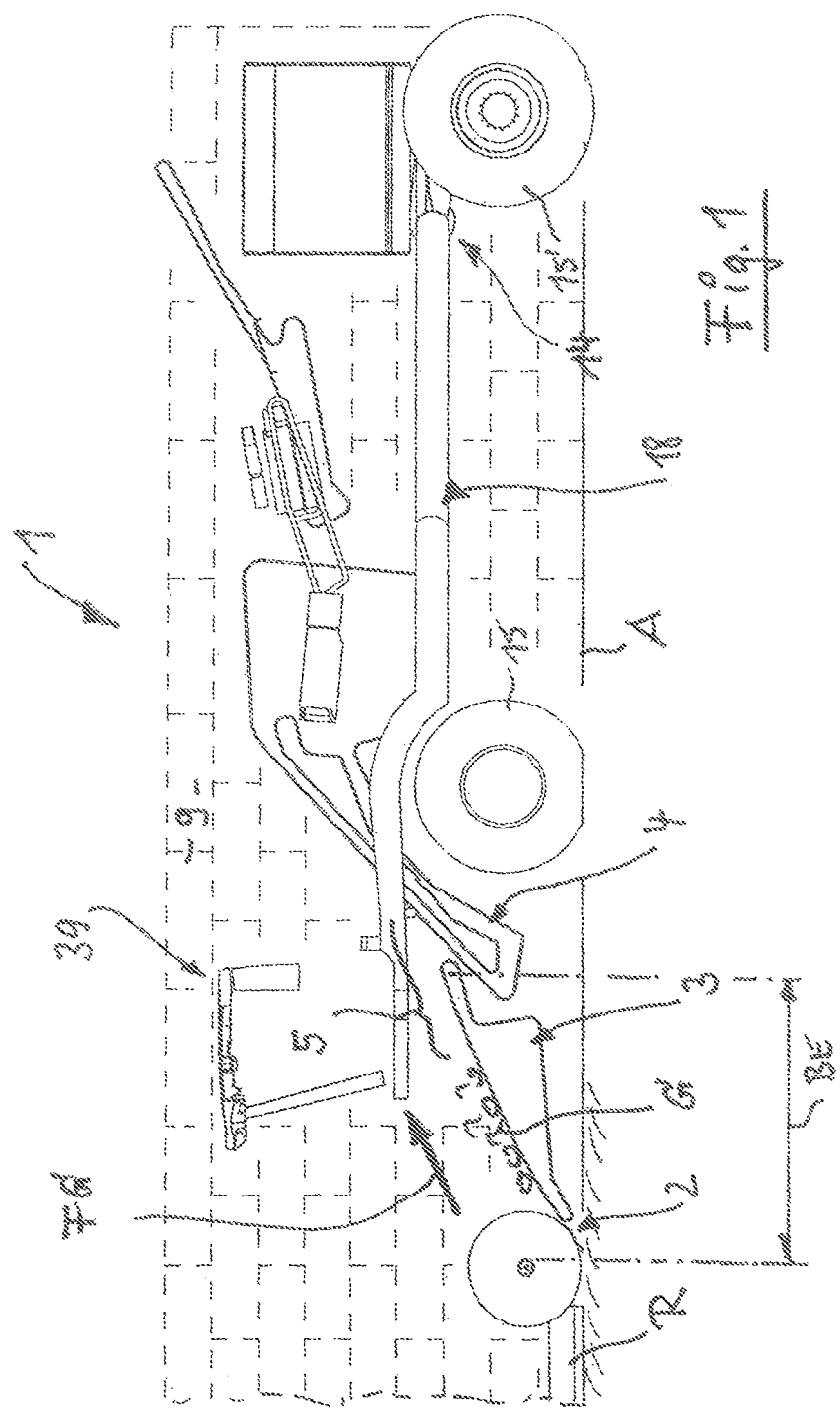
FIG. 1 a basic illustration of the complete potato harvesting machine according to the invention in a side view with schematic illustration of conveying devices.
Figure 2:
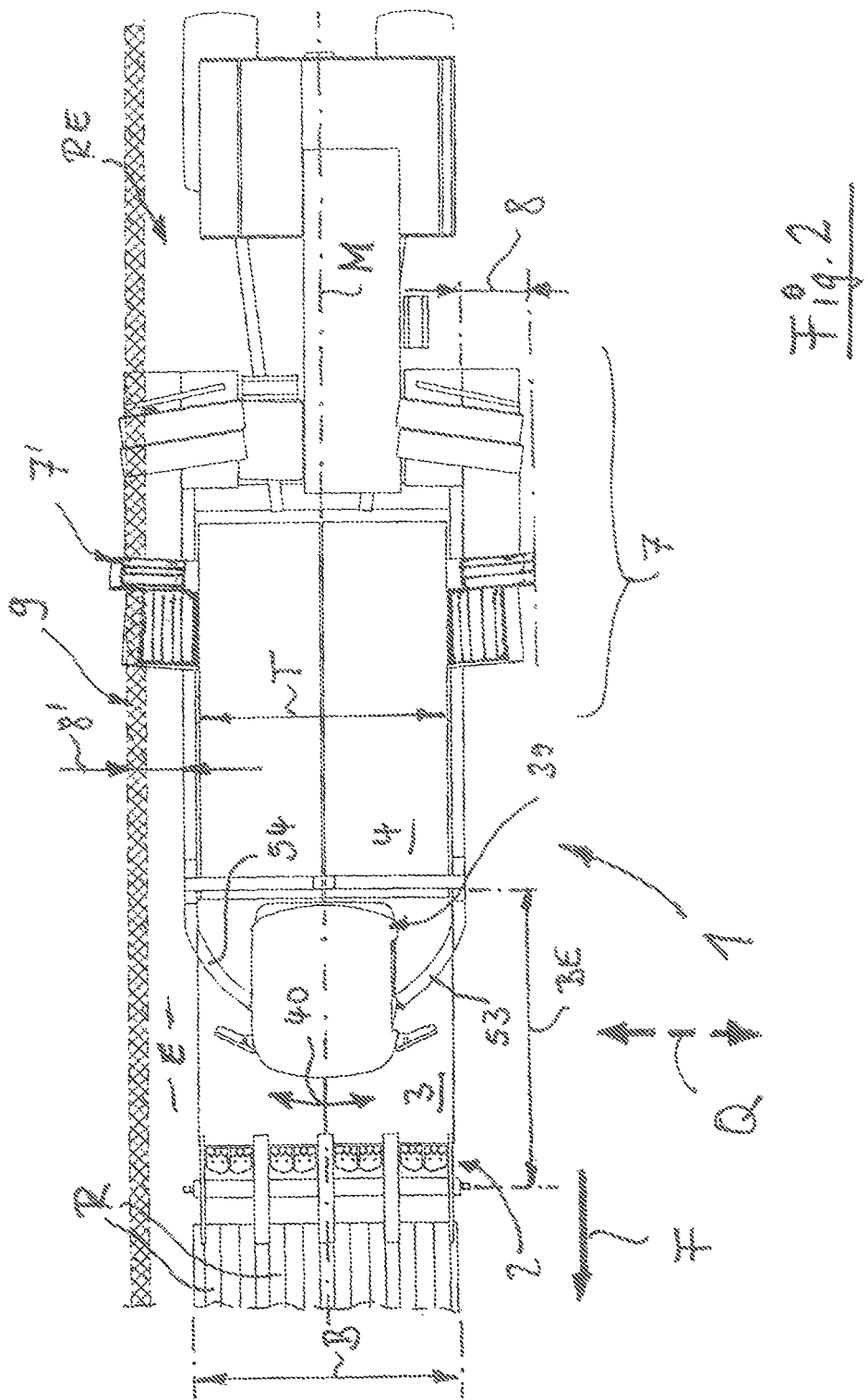
FIG. 2 a plan view of the complete potato harvesting machine during use in the boundary area of a harvest field.
Figure 3:
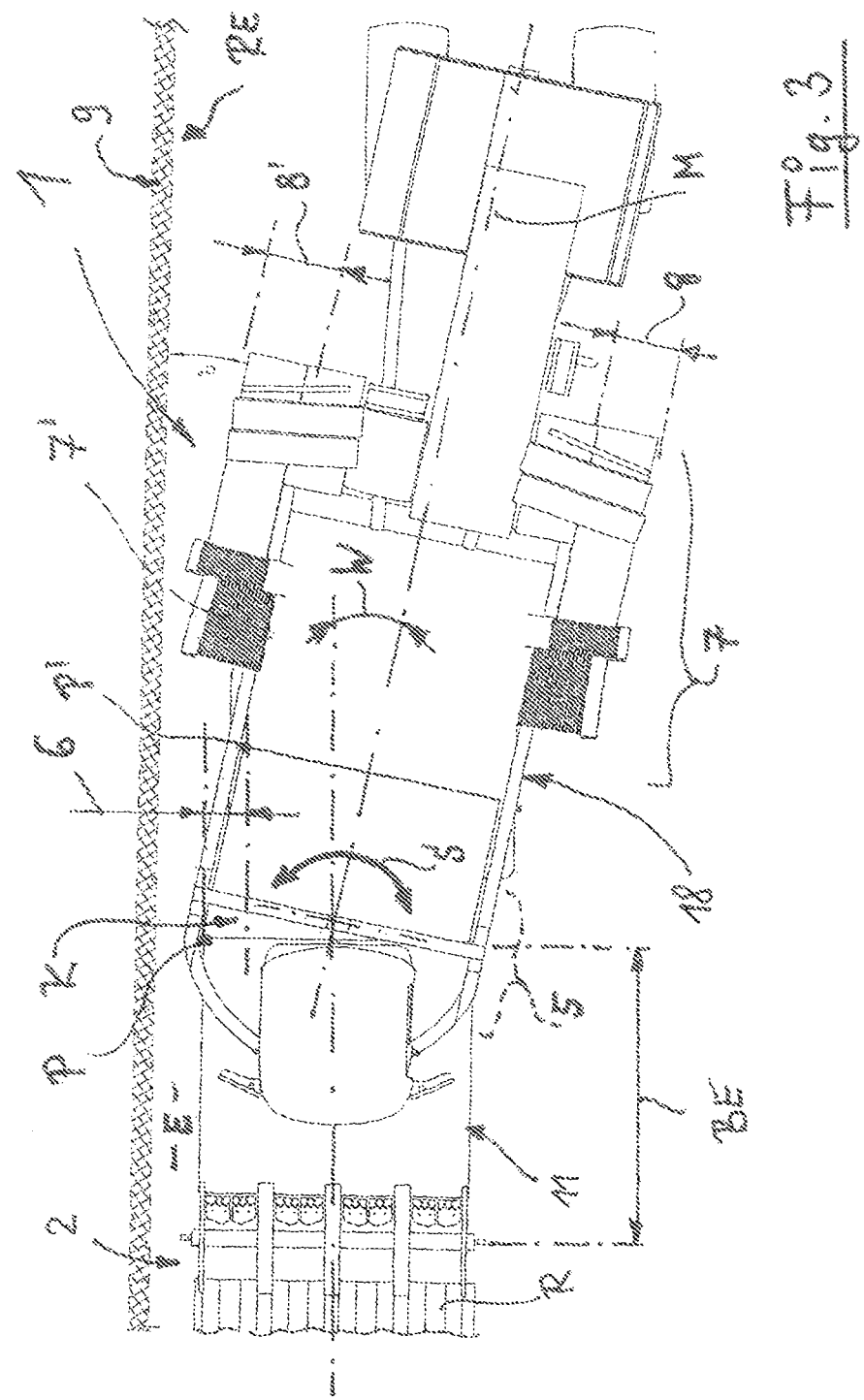
FIG. 3 a plan view similar to FIG. 2 with movement of machine component groups into a lateral spacing position relative to the boundary area of the harvest field.

In the illustrations according to FIG. 1 to FIG. 3, a machine for harvesting root crop, in particular in the form of a complete potato harvesting machine 1, is shown in respective basic illustrations. The side view according to FIG. 1 shows clearly that the construction, by use of generally known component groups, comprises a lifting device 1 that is in the position of use. In this context, on a harvest field E, in accordance with a lifting width B, several rows R of the crop with admixtures are lifted from the soil A transverse to the travel direction F.

In a self-propelled complete potato harvesting machine as disclosed in the aforementioned brochure SF 150/170-60, two rows R are lifted by means of the lifting device 2 and from there the loosened mixture G of crop and admixtures is moved by means of a first longitudinal conveyor 3 opposite to the travel direction F in the conveying direction FG. During the course of this conveying phase, a transfer onto a second screening belt conveyor 4 takes place, wherein the transfer zone 5 with a belt overlap is defined between the longitudinal conveyor 3 and the screening belt conveyor 4.

The concept according to the invention of the complete potato harvesting machine 1 is based now on the concept that the first longitudinal conveyor 3, leading in the conveying direction FG, together with the upstream lifting device 2 forms a module BE that is movable in transverse direction Q of the machine 1 relative to the second screening belt conveyor 4. In this way, an "independent" module BE is integrated in this multi-member system of the conveying and cleaning stretch with which, based on the common transfer zone 5, a lateral spacing (FIG. 3), that is generally referenced by 6, can be formed between the component groups of the crop lifting arrangement (comparative points between longitudinal conveyor 3 and screening belt conveyor 4: P, P').

This spacing displacement Q of the module BE that can be realized with constructively different means is directed at providing the machine 1 with a lateral projection 8, 8', at least on one side, in the area of devices 7 (FIG. 3) that adjoin the transfer zone 5 and are provided for travel and crop movement. Accordingly, the machine 1, based on the machine width or the leading lifting width B, can be furnished with parts that have a large size and project laterally past the maximum travel width of such systems (projection 8, 8').

Based on the basic illustration according to FIG. 3, when looking also at FIG. 2, the concept according to the invention is apparent wherein, due to the spacing 6, adjustable as a lateral displacement, of the leading module BE relative to the second screening belt conveyor 4, the use of the machine 1 can be realized even at a boundary RE of the harvest field E. By producing the lateral spacing 6 it is achieved that an evasive movement 22 in relation to an obstacle 9, shown in FIG. 2, for example, in the form of a hedge, a fence, or a wall, in the area of the lifting device 2 is no longer required and therefore disadvantageous results in the form of crop loss are avoided. Instead, by producing the lateral spacing 6, the soil strip which is extending along the boundary of the harvest field E can be completely engaged also. The "displaced" components 7' that have been moved together with the machine frame after selecting the crab steering travel position (FIG. 3) can pass without being damaged the obstacles 9 which project into this area.

It is understood that the upstream module BE at least in the area of its lifting device 2 can be positioned in the respective variably adjustable receiving areas on the soil A or at a spacing 6 to the obstacle 9 can be positioned. The constructive configuration of the system with the independent module BE or the relative movement possibility between it and the screening belt conveyor 4 enables embodiments in which respective variable widths B and/or variable numbers of rows R of the crop on the respective strip of the field can be engaged.

An advantageous embodiment of the optimized construction according to the invention provides that the leading module BE can produce the lateral spacing 6 in the form of an angle W (FIG. 3, FIG. 6) by a pivot movement S relative to the downstream screening belt conveyor 4. Accordingly, an adjustment of the system is possible in such a way that a slanted position of use of the leading module BE can be adjusted that is slanted at an acute angle, according to angle W, relative to the longitudinal machine center plane M. In this context, the conveying conditions for the mixture G across the entire working width B or T is ensured.

Figure 4:
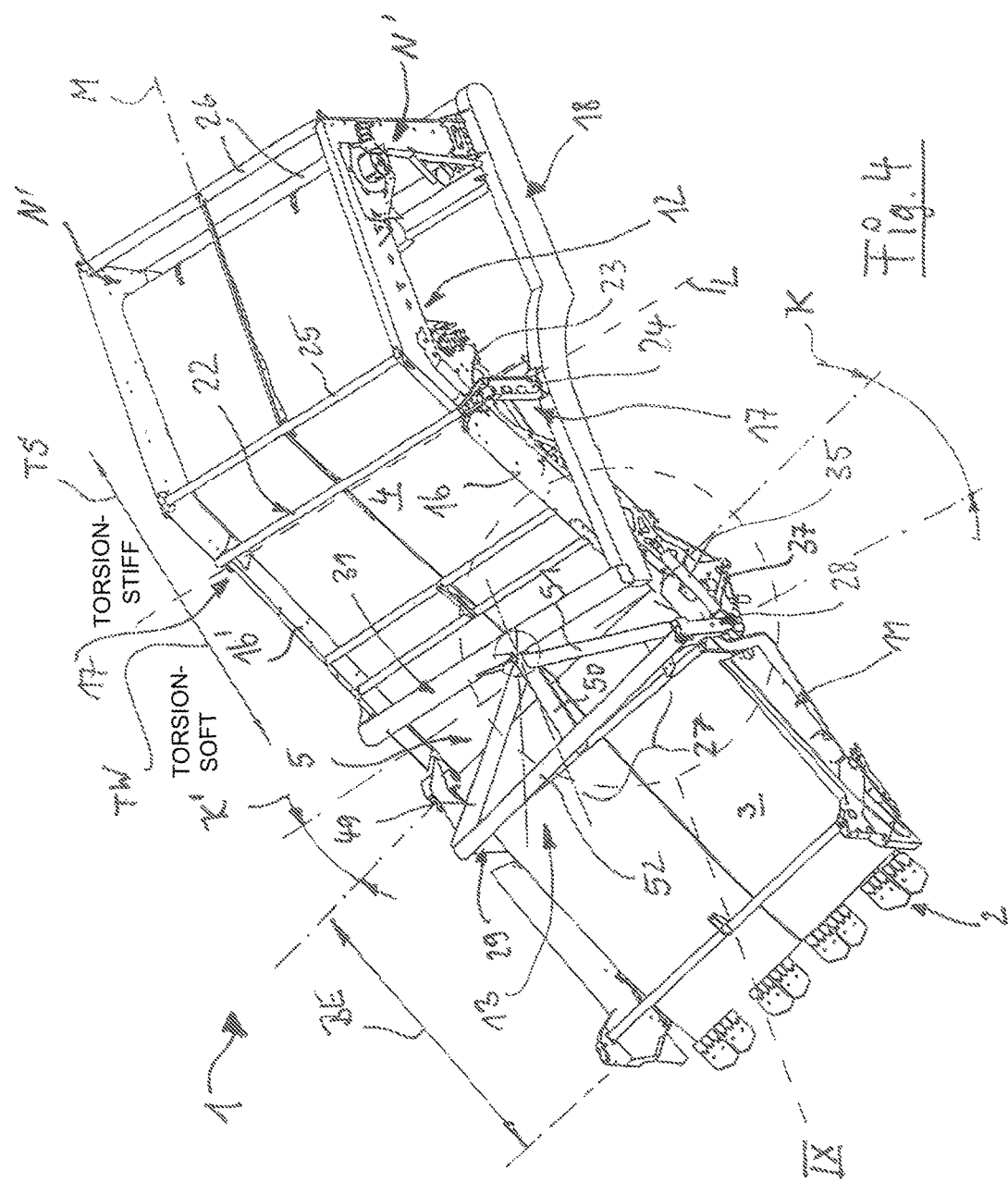
FIG. 4 a perspective illustration of the frame parts of the complete potato harvesting machine for producing the lateral spacing position according to FIG. 3.

This relative pivot movement S causes in the area of the transfer zone 5 a displacement introduced between the frame 11 of the leading module BE and the main frame 18 of the machine 1 and, in this context, a changed belt overlap is produced. The plan view according to FIG. 3 and FIG. 4 shows that the belt overlap is effective as an acute angle contour K, K'.

It is understood that, in other configurations of the system, the leading module BE can also provide a parallel lateral spacing at least to the second screening belt conveyor 4 by a push movement (similar: arrow Q, FIG. 2) that is carried out transverse to the longitudinal machine center plane M. Also, it is conceivable that the leading module BE is moved by a pivot-push displacement, not illustrated in detail, into a spacing position.

In any case, it is provided that by means of at least one actuator device 13 the relative movement, which causes the lateral displacement in the form of the spacing 6 or the angle W, can be introduced between the leading module BE and the second screening belt conveyor 4 according to the push arrow Q or the pivot arrow S.

From the basic illustrations according to FIG. 1 to FIG. 3 it is apparent that the actuator device 13 effective in the area of the transfer zone 5 is provided in particular for adaptation of the machine structure to a so-called "crab steering travel position". This generally known actuating movement is designed to enable a relative movement according to arrow S in the area of the machine frame 18 or the correlated chassis 14 with the wheel pairs 15, 15'. In this context, the travel position that is illustrated in the plan view according to FIG. 3 is adjusted so that at the longitudinal sides of the machine 1 that form the spacing dimensions 8, 8' variable active areas can be defined despite their "excess width" (FIG. 2).

Figure 5:
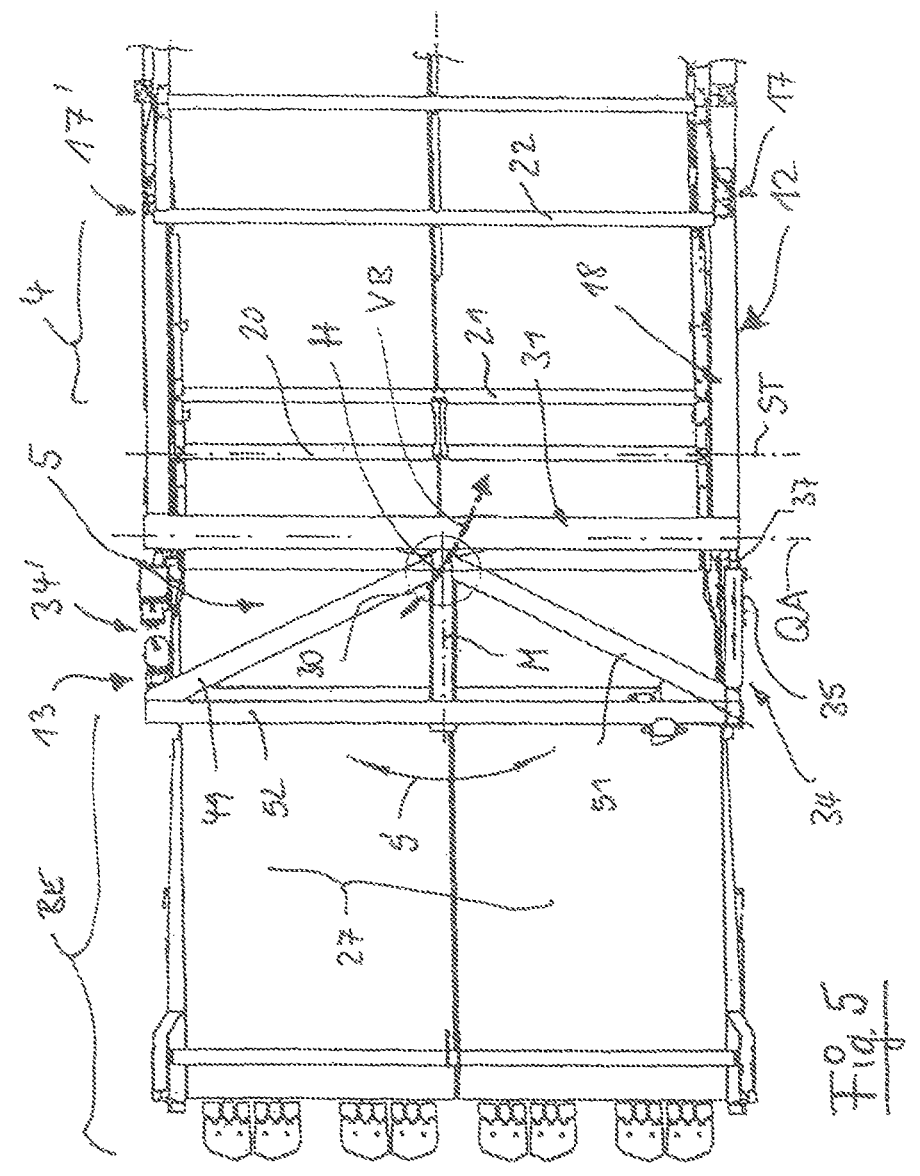
Figure 6:
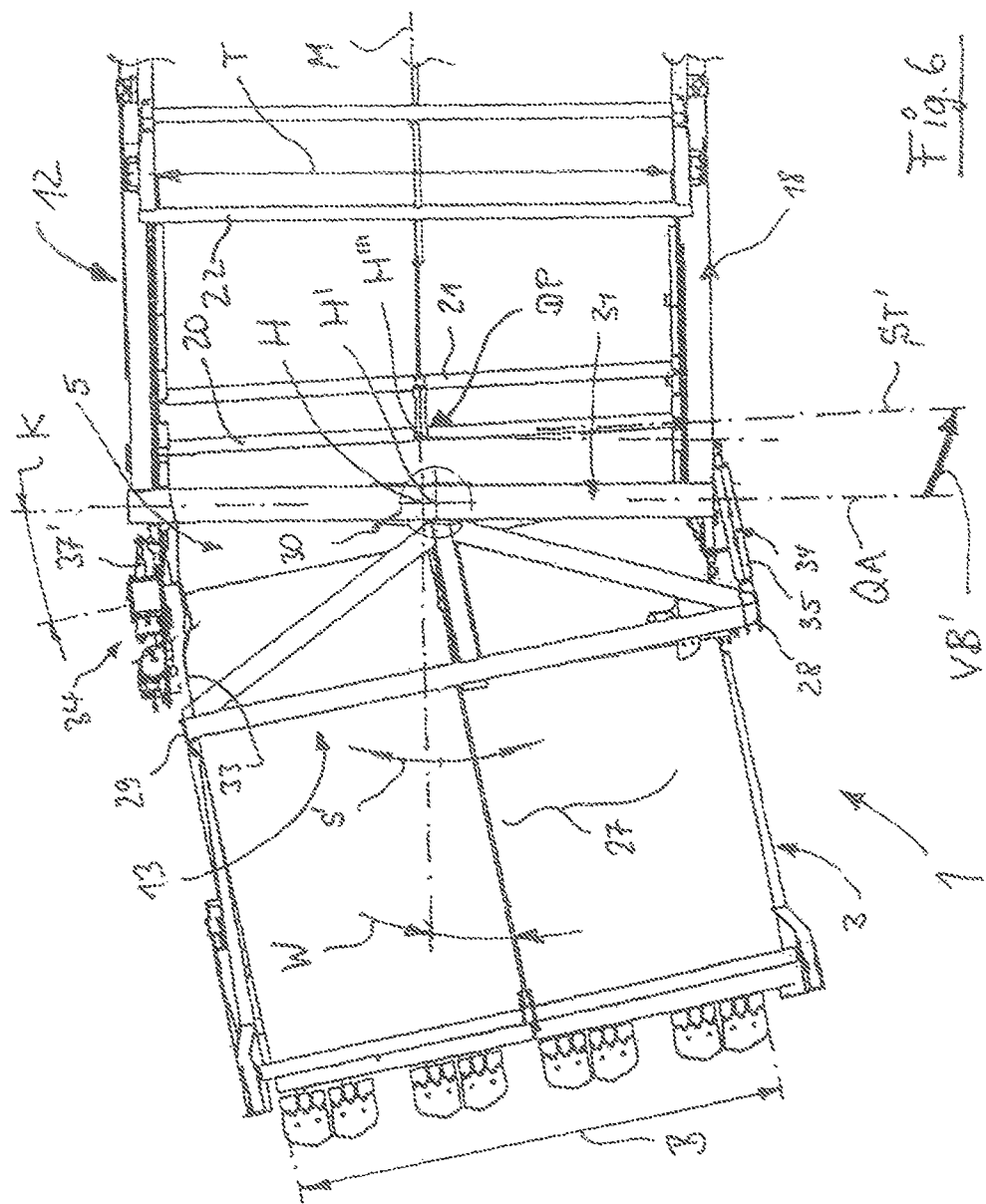
FIG. 6 a plan view of the frame parts in lateral spacing position.

The basic illustrations according to FIG. 4 to FIG. 6 elucidate the frame construction of the machine 1 in respective overview illustrations. The screening belt conveyor 4 in its receiving area oriented toward the transfer zone 5 is provided with a main frame 12 comprising at least two lateral frame struts 16, 16'. The illustration of FIG. 11 shows that the main frame 12 can also comprise a central frame strut 16".

On the one hand, the main frame 12 (FIG. 4, FIG. 5), which is designed in a plan view mirror-symmetrical to the longitudinal machine center plane M, is secured on a machine frame 18, at least at N, N', In this context, in an embodiment according to the invention, at least in an area of the main frame 12 which is generally identified by arrow TW, a torsion-soft support action for the leading partial section of the screening belt conveyor 4 is formed (FIG. 4).

Figure 11:
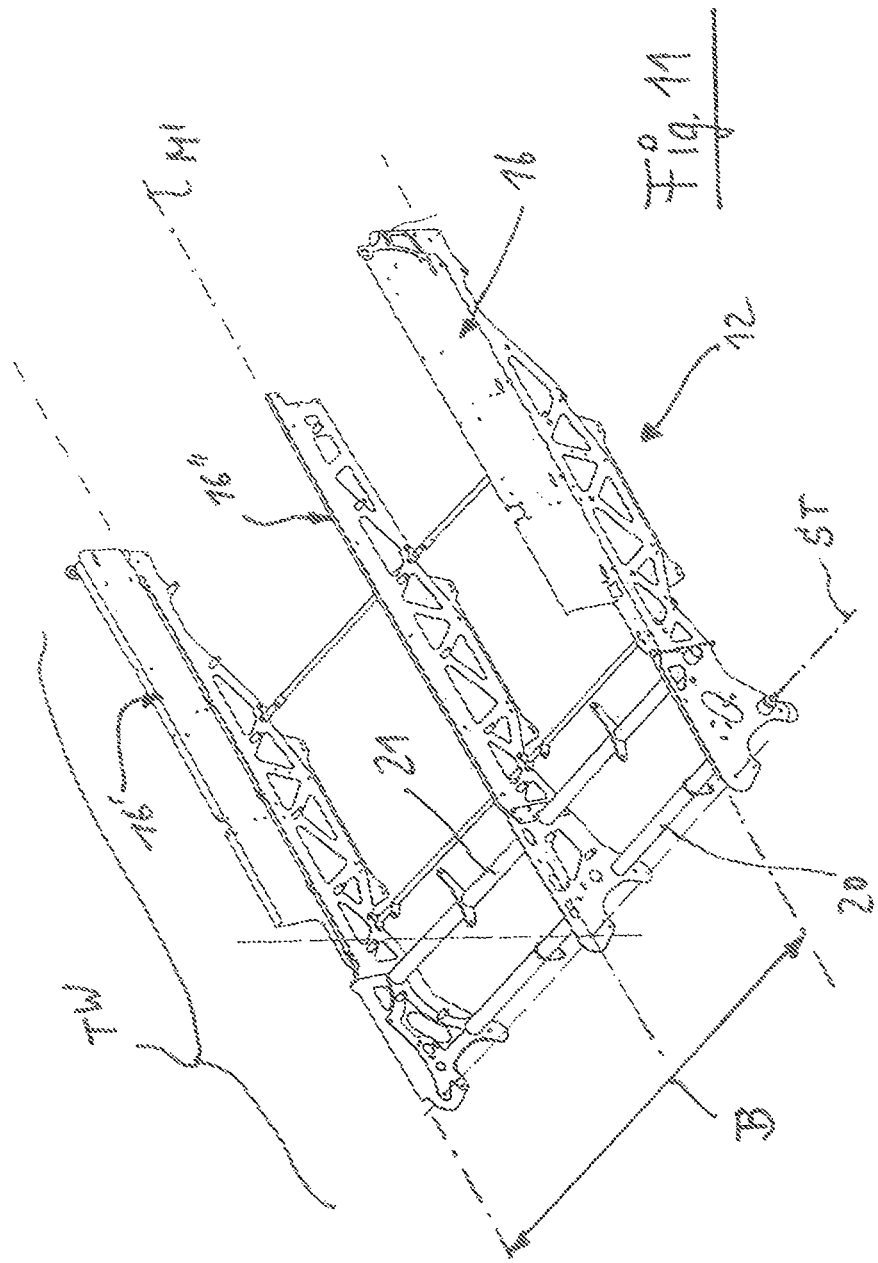
FIG. 11.
Figure 12:
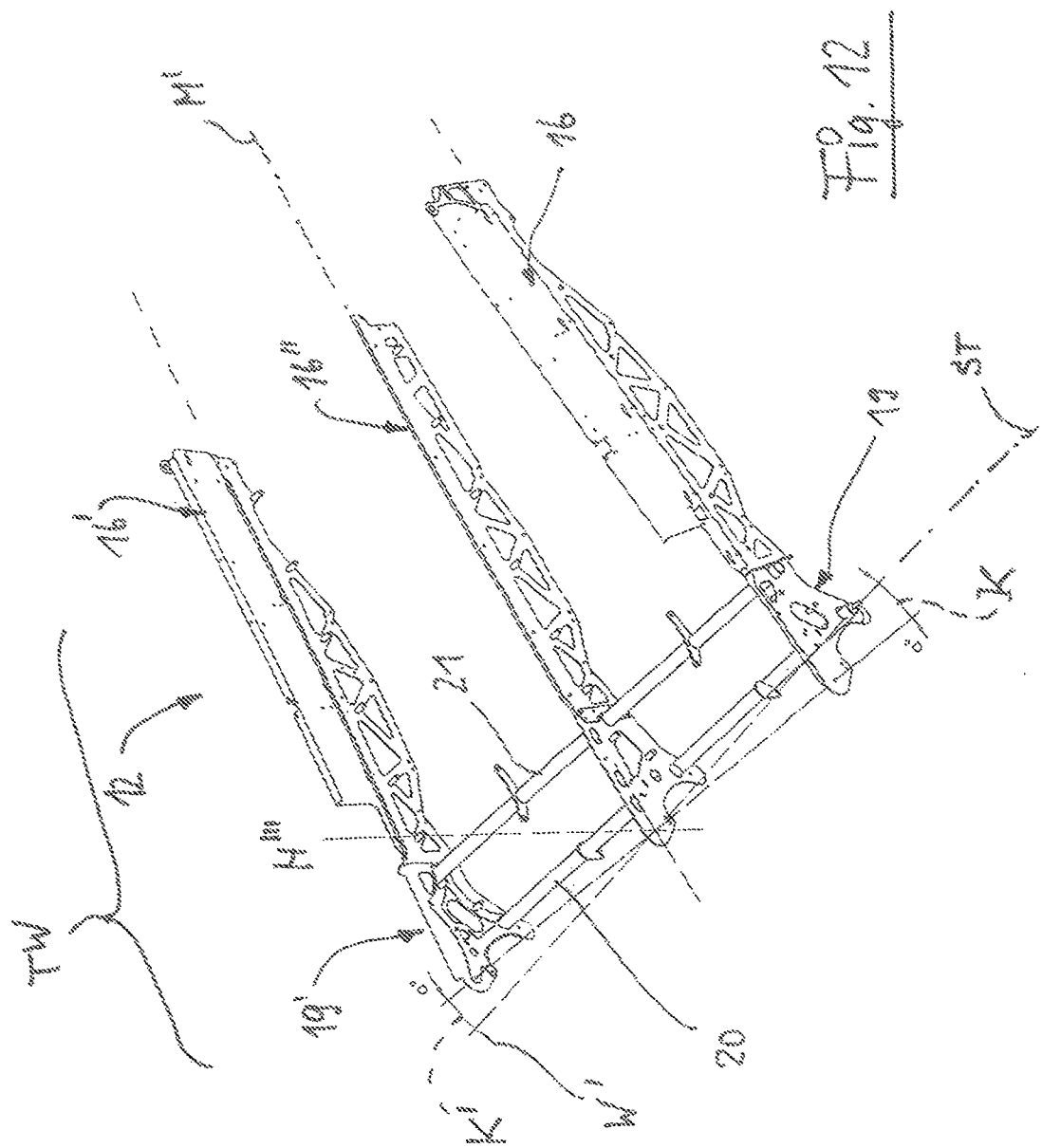
FIG. 12 enlarged detail illustration of torsion-soft frame parts in different positions.

The detail illustrations of the main frame 12 in FIG. 11 and FIG. 12 together with FIG. 4 show that the main frame 12 at the end which is oriented toward the transfer zone 5 can be provided with frame projections 19, 19'. In the area of these frame projections 19, 19', respective transverse connectors 20, 21 extending across the width B (FIG. 11) are provided. In this way, a substantially closed frame construction of the main frame 12 is achieved. The main frame 12 in the area of its respective ends 17, 17', 17" can be connected by a support bridge 22 (FIG. 4) to the machine frame 18.

In the area of this support bridge 22 respective support legs 23 and 24 (23', 24'; not visible) are provided at the opposed ends so that in this way the main frame 12 as a whole can be divided relative to the machine frame 18, on either side of an imaginary transverse line L, into a torsion-soft support of the partial section TW and a torsion-stiff section TS (FIG. 4). The torsion-stiff rearward partial section TS comprises also stabilizing transverse connectors 25, 26 toward the rearward supports N, N'. For stabilizing the screening belt 4, the third frame strut 16' (FIG. 12) that extends at least in the leading area can be centrally provided in the area of the center plane M'.

The afore described construction of the "flexible" main frame 12 interacting with the machine frame 18 is used in particular for adjusting the lateral spacing in the form of a controllable torsional deformation, according to angle K, K' (FIG. 12) of the frame struts receiving the screening conveyor belt 4. A relative movement S that is generated by means of the at least one laterally driven actuator device 13 causes the "torsionally deformed" slanted position K, K' in the system (FIG. 12). With this "torsional displacement" the component groups secured on the machine frame 18 interact as a complex actuator unit in such a way that optimal travel properties of the machine 1 in any crop lifting position are ensured. In the area of the module BE, a support frame 27 (FIG. 5, FIG. 6) that is pivotable about a substantially vertical axis H (FIG. 8) is arranged such that at least the first longitudinal conveyor 3 of the leading module BE is engaged and can be pivotably moved in the leading area of the frame construction of the machine 1. A detail illustration according to FIG. 15 shows the optimized configuration of the machine frame 18 with leading support arches 53, 54 (FIG. 2) connected by a transverse support 55. They form thus a leading beam on which the support frame 27 in the area of its beams 49, 50, 51, 52 can be supported.

Figure 8:
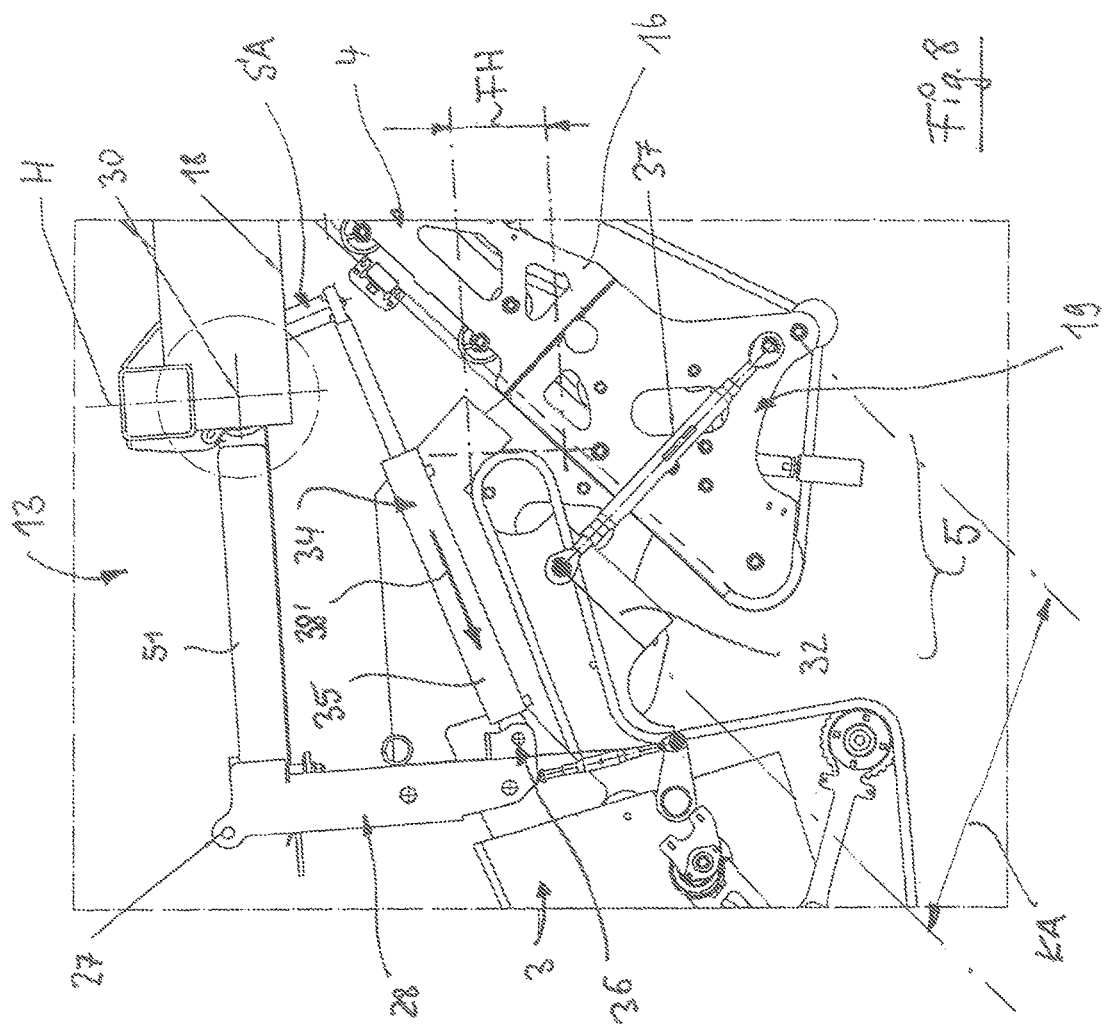
FIG. 8 an enlarged detail illustration of a transition zone VIII in the area of the conveying stretch according to FIG. 7.
Figure 9:
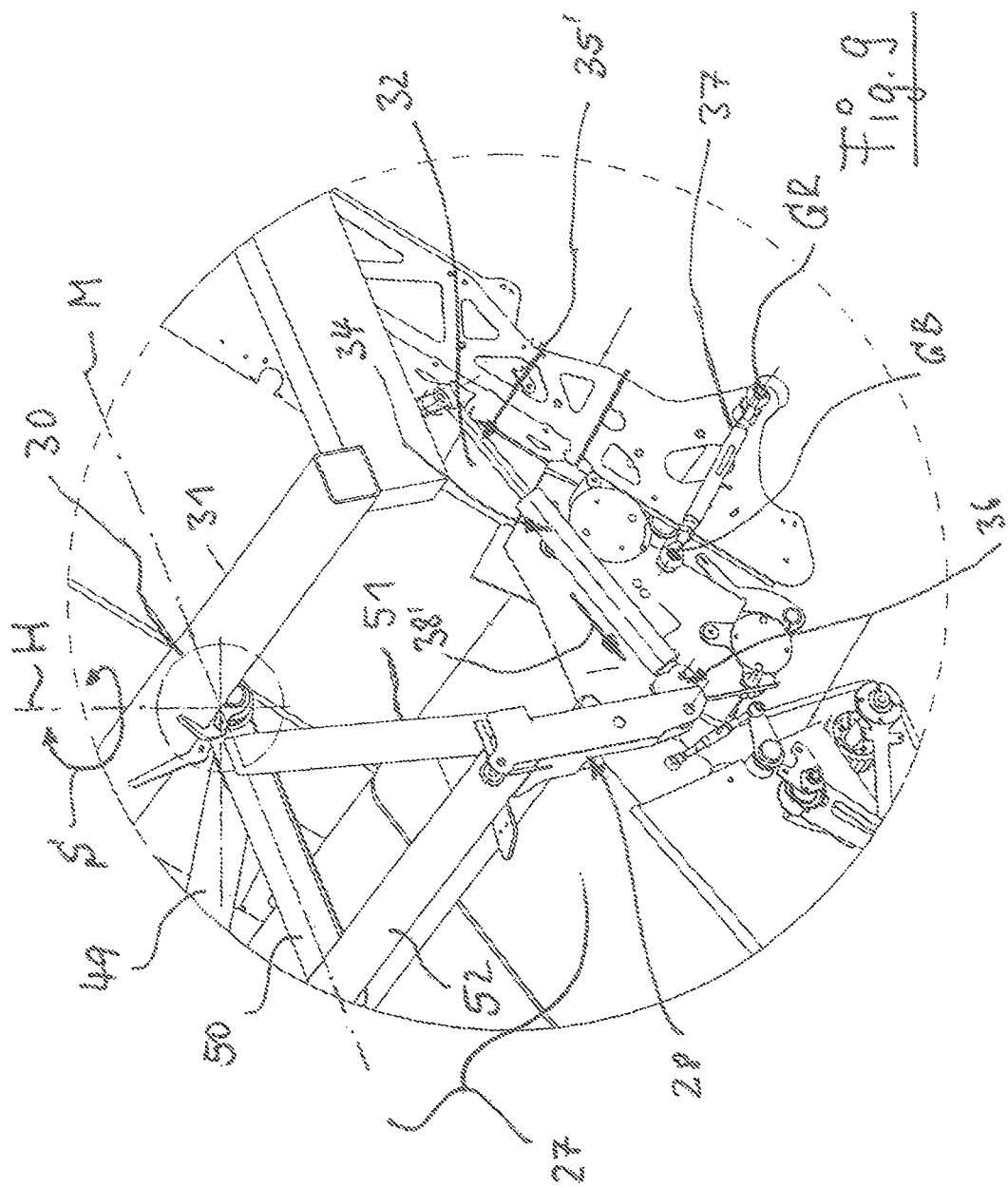
FIG. 9.
Figure 10:
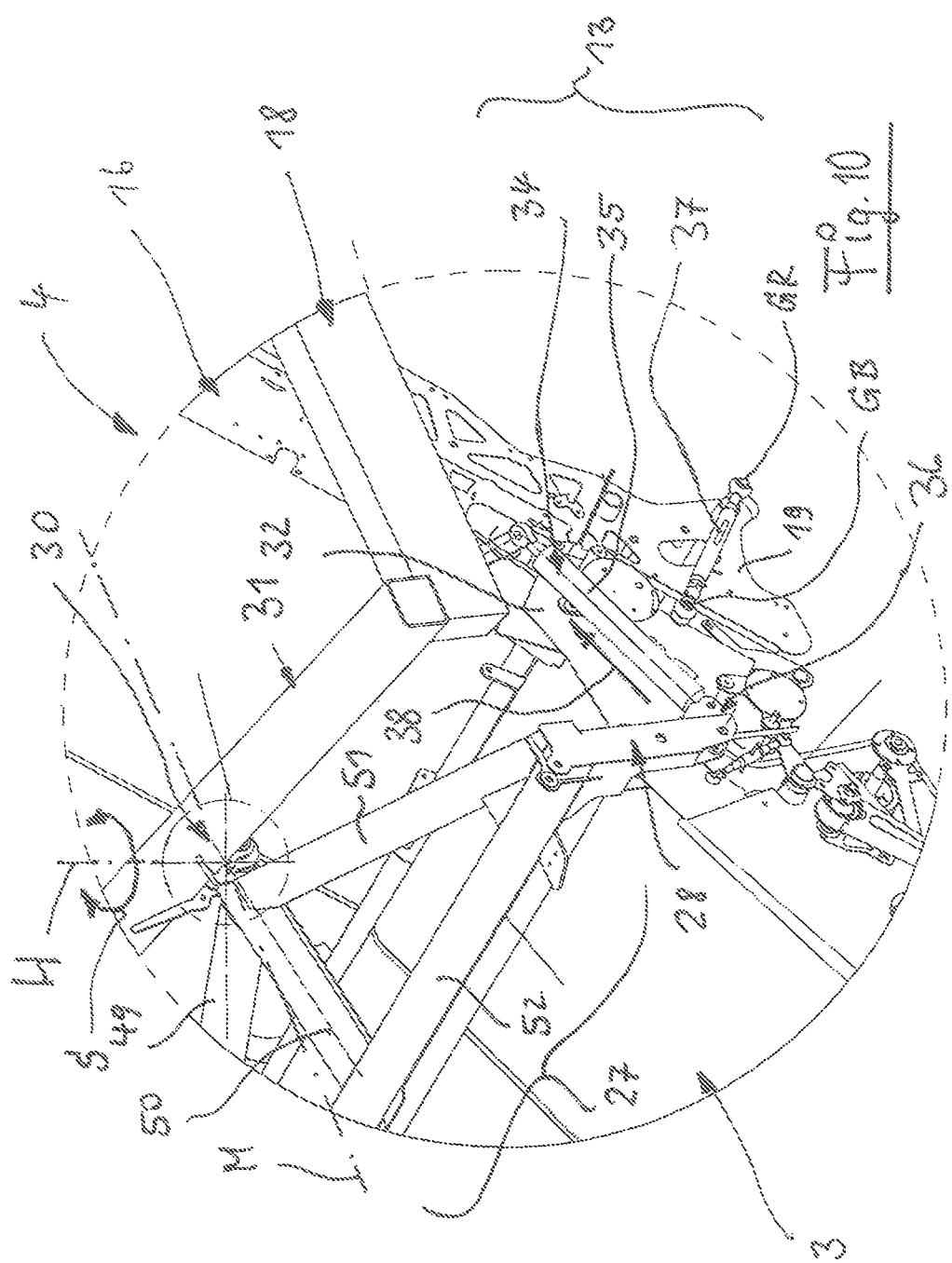
FIG. 10 respective perspective illustrations of the transfer zone according to FIG. 8 in different pivot phases.

In this way, the longitudinal conveyor 3 which is received between two leading lateral legs 28, 29 of the support frame 27 can be moved continuously by the respective lateral pivot movements S into the respectively selected slanted position of use (FIG. 4). The illustrations according to FIG. 8 to FIG. 10 illustrate that in an advantageous embodiment a pivot bearing 30 which forms the vertical axis H is connected with the machine frame 18 in the area of a transverse beam 31. In an advantageous embodiment, the support frame 27 is provided with respective beams 49, 50, 51 that form a stable triangular contour relative to a leading transverse beam 52.

Figure 7:
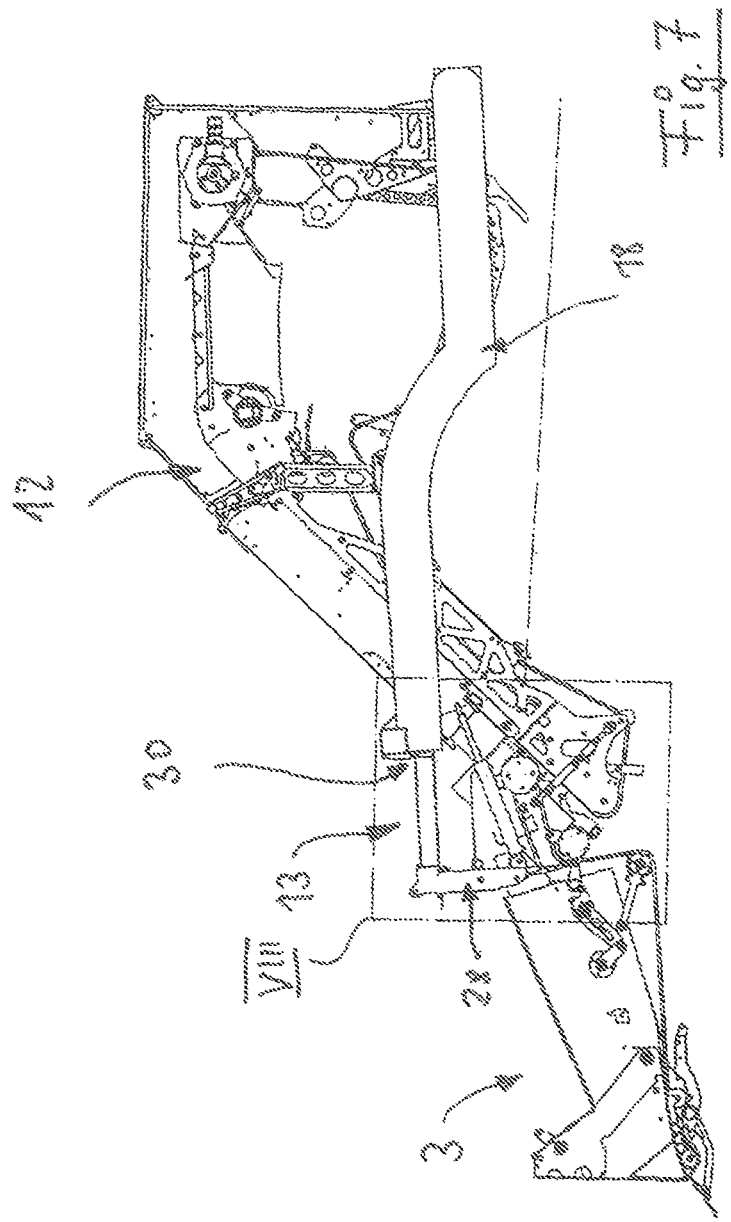
FIG. 7 a side view of the machine frame in the leading area.

The constructive configuration of the support components in the area of the actuator device 13 (FIG. 7 to FIG. 10) provides that the latter comprises support beams 49, 51 extending away from the position of the pivot bearing 30 (FIG. 7) and oriented toward the two outer lateral legs 28, 29 of the leading support frame 27, respectively. Accordingly, the module BE is provided with a support of a pivot frame type interacting with an actuator member 34 of the actuator device 13. In this context, the construction of the pivot bearing 30 is matched to the afore described functions of the system in such a way that the "pivoting" support frame 27 on the machine frame 18 in the area of the transverse beam 31 can be stationarily supported by a ball receptacle.

The further configuration of the actuator device 13 which is substantially designed mirror-symmetrical relative to the longitudinal center plane M, with the at least one actuator member 34 as a drive, is apparent from the illustrations according to FIG. 7 to FIG. 10. The at least one actuator member 34 can thus be secured in the area between the lateral legs 28, 29 of the support frame 27 and the machine frame 18 that engages the main frame 12 of the downstream screening belt conveyor 4. Advantageously, only this one actuator member 34 in the form of a hydraulic cylinder 35 is provided on the left side of the conveying stretch in the travel direction F (FIG. 5 and FIG. 6; free space 34', right side).

The basic illustrations of FIG. 5 and FIG. 6 disclose the complex action of the actuator device 13 by means of its support in the area of the respective lateral coupling rods 37 (FIG. 9), 37' (not visible). They form thus respective constructively variably adjustable connections between the main frame 12 and the components at the rearward lateral end of the longitudinal conveyor 3. The coupling rods 37, 37' engage in this context in the area of a respective hinge point GB and GR (FIG. 9) as well as GB' and GR' (on the other side, not illustrated) at the lateral component groups so that, with the provided synchronous movement at both longitudinal sides of the machine 1, the pivot movement S (FIG. 6) can be realized.

Accordingly, between the leading longitudinal conveyor 3 and the downstream screening belt conveyor 4 (or its frame projections 19, 19' with transverse connector 20; FIG. 11, FIG. 12), a "parallelogram-type" guiding structure according to a parallelogram guide is configured. By introducing an actuator movement in the area of the hydraulic cylinder 35, the "suspended" structure of the conveyor 4 below the transverse beam 31, can be moved with the parallel support axes QA and ST (FIG. 6) as a starting point. In this context, it is also conceivable that, with the central vertical axis H as a starting point in the area of the "upwardly positioned" pivot bearing 30, the "downwardly positioned" components of the module BE as well as of the conveyor 4 are moved into the position H', illustrated in FIG. 6, along a connecting path VB (basic illustration in FIG. 5, illustrated enlarged) defined by the "parallelogram" of the linkage rods 37, 37'.

By means of the movement path VB', shown in FIG. 6 as an imaginary line, synchronous movement of the two transverse stays 20, 21 in relation to the leading transverse beam 31 of the main frame 12 is illustrated in principle. In this context, it is apparent that the movement S, generated by the actuator device 13, can be performed about an "imaginary" rotary area DP on the main frame 12, wherein the curved paths VB and VB' can occur as resulting actuating travel, and, in this way, the entire component combination is optimally guided in the area of the actuator device 13. Also, it is conceivable that by means of the "elastically" interacting components of the system only comparatively minimal displacements, in the direction VB, VB', must be compensated and are then absorbed by individual parts of the pivot bearing 30 that have an appropriate stiffness.

The actuation and control concept according to the invention in the area of the module BE utilizes as a whole the combined effect of the interaction of the actuator member 34 and coupling rods 37, 37' with minimal expenditure. This is achieved in that an adjustment of the hydraulic cylinder 35 (arrow 38, 38') can be transmitted as a linear movement onto the coupling rods 37, 37' and from them the torsional deformation VB' or the contour adjustment K, K' can be affected by means of only a few component connections. The resulting force flux is guided across the torsion-stiff support frame 27 into the stationarily secured pivot bearing 30 on the machine frame 18 so that an effective movement introduction is possible with minimal component loads.

The use of the hydraulic cylinder 35 provided as one embodiment of a drive member can advantageously be improved in that it is supported proximal to one of the frame struts 16 of the screening belt conveyor 4. In this context, the rod 35' of the cylinder 35 is connected advantageously by a support projection SA with the machine frame 18 (FIG. 8) and, on the other hand, the hydraulic cylinder 35 interacts with a support component group 36 which engages the lateral leg 28 in the area of the pivot frame.

For stabilizing the component combination in the area of this transfer zone 5, in particular the afore described "parallelogram guide" with the two coupling rods 37, 37' is provided on the components at the edge of the actuator component group 13. In this way, on both sides of the system an additional guiding action and stabilization between the overlapping ends of belts 3 and 4 is achieved. By means of these coupling rods 37, 37', wherein also similar actuator elements in the form of an actuator spindle or similar advancing components are conceivable, in particular a spacing KA (FIG. 8) can be varied such that the drop height FH and the screening belt overlap K, K' are adjusted optimally. Due to the arrangement of the coupling rods 37, 37' on both sides, a constant spacing between the belts 3 and 4 is ensured so that in the varying positions of use the module BE ensures optimal conveying conditions (FIG. 9, FIG. 10).

In this connecting area, additional channel sidewalls 32 (FIGS. 9) and 33 (FIG. 6) are provided which by appropriate adjustment, during working with a suitable adjustment of the angle W, can ensure the movement of the crop stream on the transport stretch.

The perspective illustrations according to FIG. 9 and FIG. 10 illustrate the control action of the hydraulic cylinder 35. Beginning with the "normal position" of the system according to FIG. 9, a pivot displacement Sin the area of the vertical axis H is achieved in that upon actuation of the hydraulic cylinder 35, which in FIG. 9 is in the "normal position", a displacement along the rod 35' in the direction of arrow 38 is realized and thereby the inwardly positioned end position is reached. With this push movement 38, a one-sided load and displacement of the afore described components and of components in the edge area of the transfer zone 5 is initiated. This actuation movement 38, 38' can be controlled such that by use of the elastic properties of the component group (FIG. 11, FIG. 12), the desired relative displacement between module BE and machine frame 18 is achieved and the "torsional deformation" that is apparent from the illustrations of the ends of the conveyor belts 3, 4 relative to each other occurs.

Figure 13:
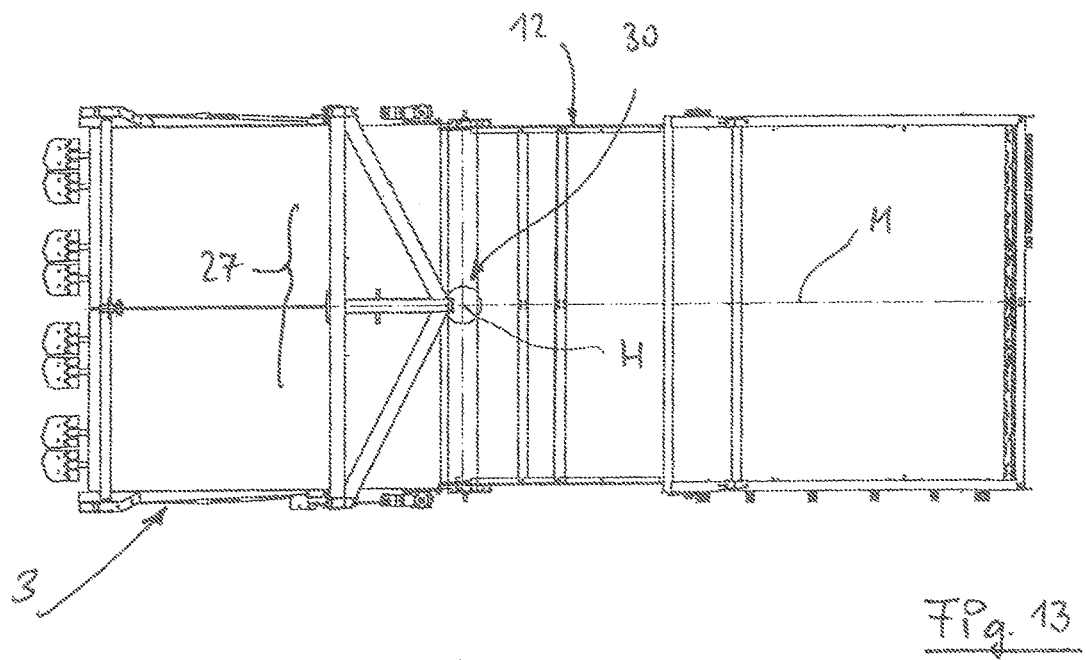
FIG. 13.
Figure 14:
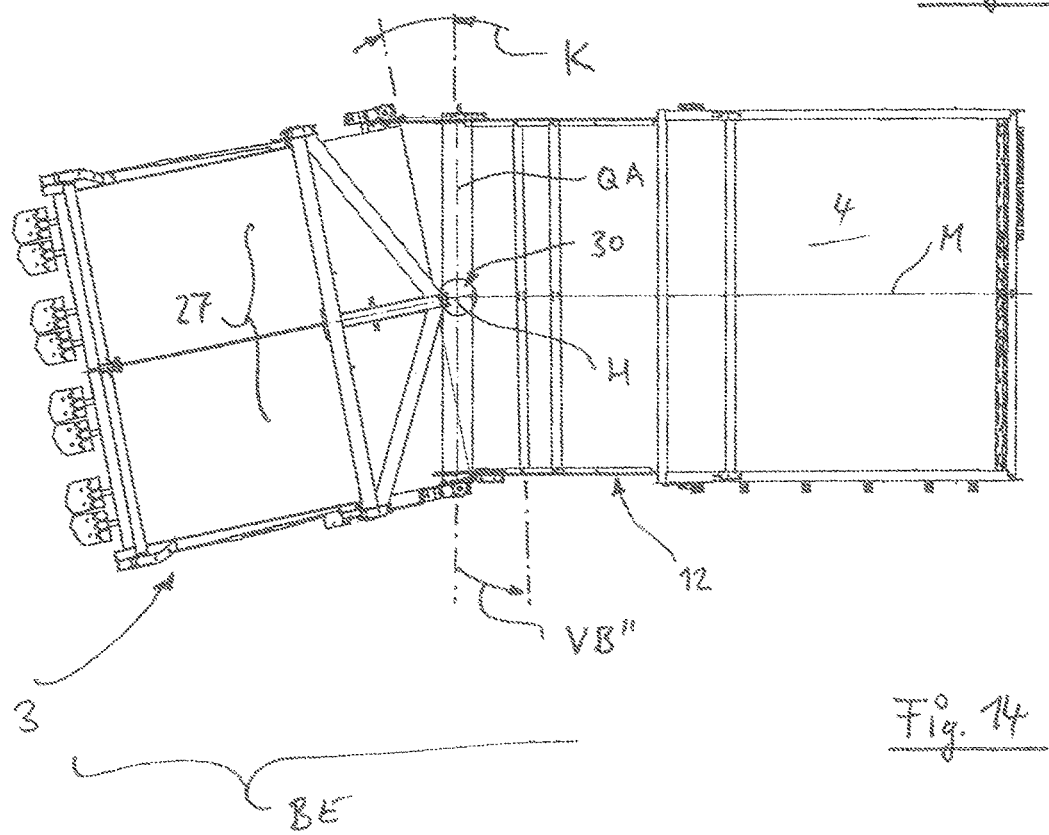
FIG. 14 respective basic illustrations similar to FIG. 5 illustrating the pivot movement in the area of the pivot bearing.

In FIG. 13 and FIG. 14, the "simple" pivot movement of the system, without displacement VB' according to FIG. 5 and FIG. 6, is illustrated in a simplified plan view. In this context, in the area of the pivot bearing 30 a ball with transverse bore (not illustrated in detail) is integrated into the holding system which ball forms the transverse axis QA.

With an appropriate return movement (arrow 38') the system can be returned again from the pivot position illustrated in FIG. 10 into the initial position according to FIG. 9. Also, it is conceivable that after a "no current position" of the hydraulic cylinder 35, realized by switching off the hydro pump (not illustrated), the system can be relieved and thus an "automatic" return movement of the "torsionally deformed" component group into the initial position can be activated.

When looking at FIG. 1 and the overview illustrations according to FIG. 11 to FIG. 15, constructive embodiments of the lifting system that is improved with regard to its lifting performance are apparent together with a driver's cabin 39 integrated into this new concept. An area above the transfer zone 5 designed in accordance with the invention is considered an optimal installation position of this driver's cabin 39, wherein here variable supports in the area of the machine frame 18 or additional component groups are conceivable.

In any case, it is provided that the driver's cabin 39 can be moved (FIG. 2, arrow 40) independent of the component groups of the machine frame 18. An advantageous configuration provides that the driver's cabin 39 is secured in the area of the support frame 27 supporting the first longitudinal conveyor 3. This has the result that the driver's cabin 39 can be moved also together with the support frame 27.

A further optimization of the pivot system, according to adjusting movement S or adjusting angle W, provides that defined support points are integrated into the component concept in whose area damping and/or friction reducing elements are provided. In FIG. 15, a conceivable support on an upper friction surface RF in the area of the support arches 53, 54 of the machine frame 18 is illustrated in the form of the respective support parts 56, 57. Conceivable are also lateral contact buffers 58 in the area between the machine frame 18 and main frame 12 (FIG. 15, right side).

The specification incorporates by reference the entire disclosure of German priority document 10 2014 015 834.9 having a filing date of Oct. 28, 2014.

While specific embodiments of the invention have been shown and described in detail to illustrate the inventive principles, it will be understood that the invention may be embodied otherwise without departing from such principles.

What is claimed is:

1. A self-propelled machine for harvesting root crop, the self-propelled machine comprising:
   a lifting device (2) comprising a lifting width (B) extending in a transverse direction (Q) of the self-propelled machine transverse relative to a travel direction (F) of the self-propelled machine and configured to lift, in a position of use on a harvest field (E), several rows (R) of crop with admixtures from the soil (A) in accordance with the lifting width (B);
   a longitudinal conveyor (3) configured to convey the loosened mixture (G) of crop and admixtures away from the lifting device (2) in a direction opposite to the travel direction (F);
   a screening belt conveyor (4) arranged downstream of the longitudinal conveyor (3) and comprising a main frame (12);
   a transfer zone (5) defined between the longitudinal conveyor (3) and the screening belt conveyor (4) and providing a belt overlap of the longitudinal conveyor (3) and of the screening belt conveyor (4);
   wherein the longitudinal conveyor (3) together with the lifting device (2) forms a moveable leading module (BE) of the self-propelled machine in the travel direction (F);
   wherein the moveable leading module (BE) is configured to perform a pivot movement (S), relative to the transfer zone (5), into a spacing position of a lateral spacing (6; W, W') relative to the screening belt conveyor (4) and wherein said pivot movement (S) induces a torsional deformation in the main frame (12) of the screening belt conveyor (4).

2. The self-propelled machine according to claim 1, further comprising devices (7, 7') that are configured to provide travel and crop movement and that adjoin the transfer zone (5), wherein the self-propelled machine further comprises component groups in the area of the devices (7, 7') configured to provide travel and crop movement, wherein the component groups define an at least one-sided lateral projection (8, 8') relative to a machine width or the lifting width (B).

3. The self-propelled machine according to claim 1, wherein the movable leading module (BE) at least in the area of the lifting device (2) comprises variably adjustable receiving areas to be positioned on the soil (A).

4. The self-propelled machine according to claim 1, wherein, relative to the lifting width (B), the movable leading module (BE) and the screening belt conveyor (4) form a cleaning stretch with substantially unchangeable transport width (T).

5. The self-propelled machine according to claim 1, wherein the lateral spacing (6; W, W') of the movable leading module (BE) relative the screening belt conveyor (4) is acting as a lateral displacement and is variably selectable such that, in the position of use of the self-propelled machine (1) at a boundary of the harvest field (E), the self-propelled machine (1) is configured to engage a soil strip extending close to the boundary of the harvest field (E) and to pass obstacles (9) projecting into the soil strip.

6. The self-propelled machine according to claim 1, wherein, by said pivot movement (S) relative to the screening belt conveyor (4), the movable leading module (BE) defines a slanted position of use at an acute angle (angle W) relative to a longitudinal machine center plane (M) within a system comprising the lifting device (2), the longitudinal conveyor (3), and the screening belt conveyor (4).

7. The self-propelled machine according to claim 6, wherein the movable leading module (BE) comprises a module frame (11), wherein a relative displacement between the module frame (11) and the main frame (12) within the transfer zone (5) is effective such that the belt overlap has an acute angle contour (K) in a plan view.

8. The self-propelled machine according to claim 1, wherein the movable leading module (BE) is configured to be moved by a push movement (Q) transverse to a longitudinal machine center plane (M) and to generate the lateral spacing (6) parallel to at least the screening belt conveyor (4).

9. The self-propelled machine according to claim 1, wherein the movable leading module (BE) is configured to be moved additionally by a push movement into the spacing position.

10. The self-propelled machine according to claim 1, further comprising at least one actuator device (13) configured to actuate said pivot movement between the movable leading module (BE) and the screening belt conveyor (4) to generate the lateral spacing (6; W, W').

11. The self-propelled machine according to claim 10, wherein the at least one actuator device (13) is configured to adapt a machine structure of the self-propelled machine to a crab steering travel position such that on opposed longitudinal sides of the self-propelled machine (1) variable effective areas are defined.

12. The self-propelled machine according to claim 10, wherein, viewed in the conveying direction (FG), the transfer zone (5) provided between a rearward end of the movable leading module (BE) and a receiving area of the screening belt conveyor (4) comprises a drop height (FH) affecting a conveying stream (G) of the crop.

13. The self-propelled machine according to claim 12, wherein the at least one actuator device (13) is configured to adjust the drop height (FH); the belt overlap; or the drop height (FH) and the belt overlap.

14. The self-propelled machine according to claim 1, further comprising a machine frame (18), wherein the main frame (12) is arranged in the receiving area of the screening belt conveyor (4) facing the transfer zone (5) and comprises lateral frame struts (16, 16'), wherein the main frame (12) is secured (at 17, 17') on the machine frame (18) such that at least sectionwise a torsion-soft support at least of partial sections of the screening belt conveyor (4) is formed.

15. The self-propelled machine according to claim 14, wherein the main frame (12) is of a multi-part configuration and is provided with frame projections (19, 19') disposed at least at ends of the frame struts (16, 16') that are facing the transfer zone (5).

16. The self-propelled machine according to claim 15, further comprising a support bridge (22) connecting the main frame (12) of the screening belt conveyor (4) to the machine frame (18), wherein the support bridge (22) divides the main frame (12) into a torsion-soft leading partial section (TW) subjected to said torsional deformation and a torsion-stiff rearward partial section (TS).

17. The self-propelled machine according to claim 15, further comprising a support frame (27) comprising two lateral legs (28, 29) and comprising a centrally arranged pivot bearing (30) pivotably supporting the movable leading module (BE) to perform said pivot movement (S), wherein the pivot bearing is arranged in the area of a longitudinal machine center plane (M) and has a substantially vertically extending axis (H), wherein the longitudinal conveyor (3) is received between the two lateral legs (28, 29) of the support frame (27) and is positionable by said pivot movement (S) into positions of use (W, W') slanted relative to the longitudinal machine center plane (M).

18. The self-propelled machine according to claim 17, wherein the pivot bearing (30) is connected to the machine frame (18) in the area of a transverse beam (31) of the machine frame (18).

19. The self-propelled machine according to claim 17, further comprising at least one actuator device (13) configured to actuate said pivot movement (S) between the movable leading module (BE) and the screening belt conveyor (4) to generate the lateral spacing (6; W, W'), wherein the at least one actuator device (13) comprises support beams (49, 50) connected with a first end to the pivot bearing (30) and extending with a second end away from the pivot bearing toward the two outer lateral legs (28, 29) of the support frame (27), wherein the support beams (49, 50) together with at least one transverse beam (52) form a support in the form of a pivot frame interacting with at least one actuator member (34) of the actuator device (13).

20. The self-propelled machine according to claim 19, wherein the at least one actuator member (34) is provided at least in one area provided between the lateral legs (28, 29) of the support frame (27) and the main frame (12) of the screening belt conveyor (4).

21. The self-propelled machine according to claim 20, wherein the at least one actuator member (34) is a hydraulic cylinder (35).

22. The self-propelled machine according to claim 20, wherein the hydraulic cylinder (35) comprises a first end and a second end, wherein the first end is supported on the machine frame (18) in the area of the screening belt conveyor (4) and the second end is connected with a support component group (36) engaging one of the lateral legs (28).

23. The self-propelled machine according to claim 19, further comprising lateral coupling rods (37, 37') arranged in the area of the transfer zone (5) or in the area of the actuator device (13) and providing a constructively adaptable connection between the main frame (12) and the rearward lateral end of the longitudinal conveyor (3).

24. The self-propelled machine according to claim 23, wherein the lateral coupling rods (37, 37') form a parallelogram guide structure comprising hinge points (GB, GR; GB', GR').

25. The self-propelled machine according to claim 23, wherein the parallelogram guide structure controls the relative movement between the longitudinal conveyor (3) and the screening belt conveyor (4) in the area of the transfer zone (5), wherein the relative movement is introduced by the at least one actuator member (34).

26. The self-propelled machine according to claim 23, wherein the lateral coupling rods (37, 37') form a parallelogram guide structure comprising hinge points (GB, GR; GB', GR') and interact with at least one transverse stay (20, 21) of the main frame (12).

27. The self-propelled machine according to claim 23, wherein the machine frame (18) comprises contact and support parts (56, 57) acting as damping and/or friction reducing elements.

28. The self-propelled machine according to claim 1, further comprising a driver's cabin (39) that is extending substantially above the transfer zone (5) and is supported on a machine frame (18) of the self-propelled machine (1).

29. The self-propelled machine according to claim 28, wherein the driver's cabin (39) is movable independent of component groups of the machine frame (18) of the self-propelled machine (1).

30. The self-propelled machine according to claim 28, wherein the driver's cabin (39) is secured in the area of a support frame (27) supporting the longitudinal conveyor (3).

31. The self-propelled machine according to claim 30, wherein the driver's cabin (39) is movable together with the support frame (27).

* * * * *